United States Patent [19]

Nakane et al.

[11] Patent Number: 4,954,540
[45] Date of Patent: Sep. 4, 1990

[54] HALOGEN-CONTAINED POLYESTER RESIN COMPOSITE AND ELECTRIC WIRE

[75] Inventors: Toshio Nakane, Fuji; Kenji Hijikata, Mishima; Yukihiko Kageyama, Fujinomiya; Michiro Naka, Fuji, all of Japan

[73] Assignee: Polyplastics Co., Ltd., Osaka, Japan

[21] Appl. No.: 164,225

[22] Filed: Mar. 3, 1988

[30] Foreign Application Priority Data

Apr. 13, 1987 [JP] Japan .................................. 62-90599

[51] Int. Cl.$^5$ ............................................. C08K 5/34
[52] U.S. Cl. ....................................... 524/86; 428/395; 428/458
[58] Field of Search .................. 528/299, 305; 524/86; 428/395, 458

[56] References Cited

U.S. PATENT DOCUMENTS

| | | | |
|---|---|---|---|
| 2,327,760 | 8/1943 | Bestian et al. | 524/86 |
| 3,640,964 | 2/1972 | Stewart et al. | 528/299 |
| 3,681,358 | 8/1972 | Kleiner | 548/968 |
| 3,776,887 | 12/1973 | Juelke et al. | 528/299 |
| 3,873,504 | 3/1975 | Boettcher et al. | 528/305 |
| 3,959,228 | 5/1976 | Massey | 525/437 |
| 3,966,682 | 6/1976 | Nelson et al. | 528/299 |
| 4,028,308 | 6/1977 | Nelson | 528/299 |
| 4,080,360 | 3/1978 | Schlicting et al. | 524/98 |
| 4,499,219 | 2/1985 | Buxbaum et al. | 524/98 |

FOREIGN PATENT DOCUMENTS

| 2533097 | 2/1977 | Fed. Rep. of Germany | 524/86 |
|---|---|---|---|
| 57-002353 | 1/1982 | Japan | 524/86 |

*Primary Examiner*—Veronica P. Hoke
*Attorney, Agent, or Firm*—Birch, Stewart, Kolasch & Birch

[57] ABSTRACT

A halogen-containing polyester resin composition comprises a flame retardant aromatic polyester copolymer having a halogen content of 0.5 to 30 wt. %, obtained by poly-condensating (A) mainly aromatic dicarboxylic acids or ester-forming derivatives thereof;
(B) mainly aliphatic glycols or ester-forming derivatives thereof; and
(C) halogen-containing ester-forming compounds, and 0.1 to 10 wt. %, based, on the entire composition of a bisaziridine compound. The composition is useful to coat an electric wire therewith.

15 Claims, No Drawings

HALOGEN-CONTAINED POLYESTER RESIN COMPOSITE AND ELECTRIC WIRE

FIELD OF THE INVENTION

The present invention relates to a coating material of an electric wire, in particular to a polyester resin composite, of which flexibility is not lost by thermal hysteresis and flame resistance is superior. The coating material is obtained by adding bisaziridine compounds to halogen-contained flame-resisting aromatic polyester copolymers and the present invention is directed to an electric wire coated therewith.

PRIOR ART AND PROBLEMS TO BE SOLVED

Rubber, polyvinylchloride, polyethylene, polypropylene, nylon and the like have been used as a coating material of an electric wire. In particular, an important position has been given to polyvinylchloride in view of its flame resistance and mechanical strength. Recently, circumstances, where these coating materials are used has become severe, requiring the coating materials to exhibit superior heat resistance, electrical characteristics, flame resistance and thin-wall workability for achieving a savings in space.

Fluorine resins, cross-linked polyethylene and the like meet these requirements but all of these materials are inferior in thin-wall workability and fluorine resins are expensive, so that it can not be said that they are satisfactory.

Polyethylene terephthalate and polybutylene terephthalate are gathering interest in view of their superior thin-wall workability, mechanical strength (such as flexibility and abrasion-resistance), heat-resistance and electrical characteristics but they are insufficient in flame-resistance and crystallinity, so that not only is their flexibility remarkably lowered by thermal hysteresis, such as a heat treatment after coating and heating condition during use, but also mechanical strength, such as impact resistance, are lowered. Accordingly, they must avoid being used near a heat source and in an environment having the possibility that heat will accumulate. That is to say, their use is seriously limited.

In order to overcome these defects, elastomers and polymers have been added to lower the crystallinity. In addition, in order to maintain the stability of mechanical strength, a partial cross-linkage and the like have been tried.

In the former, a slight improvement effect is observed but since a crystalline resin matrix exists as it is, polyalkylene terephthalates can not stand long-range thermal hysteresis. In addition, a defect occurs in that a reduction in the share of crystalline resin leads to a deterioration of mechanical characteristics such as frictional abrasion.

In addition, in the latter, an improvement in the stability of the mechanical characteristics resulting from the cross-linkage is slightly observed but defects occur in that the flexibility is sacrificed and the progress of the cross-linking reaction leads to a complicated control, so that the workability is remarkably lowered.

MEASURES FOR SOLVING THE PROBLEMS

In view of the above described problems, the present inventors earnestly investigated the possibility of obtaining a coating material for use in electric wire which does not lose flexibility by thermal hysteresis and is superior in flame resistance, mechanical characteristic and electric characteristic, and have discovered that the above described coating material can be obtained by adding specified compounds to halogen-contained flame-resisting aromatic polyesters, thereby achieving the present invention.

That is to say, the present invention relates to a halogen-containing polyester resin composite, characterized in that bisaziridine compounds are added to flame-resisting aromatic polyester copolymers containing halogen at a ratio of 0.5 to 30% by weight obtained by polycondensating (A) mainly aromatic dicarboxylic acids or ester-forming derivatives thereof;

(B) mainly aliphatic glycols or ester-forming derivatives thereof; and (C) halogen-containing ester-forming compounds said bisazilizine compounds being present in an amount of 0.1 to 10% by weight based on a total quantity of the composite. An electric wire is then coated therewith.

It is remarkably difficult to simultaneously meet the requirements of various characteristics, such as flame resistance, frictional abrasion resistance and flexibility (bending property and high elongation), which are required for use as the coating material of the electric wire, as in the present invention, and the requirements of characteristics of maintaining an initial high elongation and bending property without losing the flexibility by the thermal hysteresis even in the heated environment for a long time. It is wonderful that a combination of halogenated copolyesters of polyalkylene terephthalates with bisaziridine compounds at an appointed ratio meets various kinds of characteristics required for a coating material for electric wire, in particular the addition of diaziridine compounds which leads to the prevention of the flexibility being lost by the thermal hysteresis and a remarkable increase in stability in a long-range heated environment.

The polyester copolymer composite used in the present invention is concretely described below.

At first, the ingredients constructing the aromatic polyester copolymers as the base of the coating material according to the present invention are described. The ingredient (A) is mainly aromatic dicarboxylic acids or ester-forming derivatives thereof. The representative substances thereof include terephthalic acid or derivatives thereof. In addition, dicarboxylic acids, such as isophthalic acid, naphthalene carboxylic acid and naphthalene dicarboxylic acid, or derivatives, fatty acids, such as adipic acid, sebacic acid, trimeritic acid and succinic acid, or ester-forming derivatives thereof and aromatic hydroxycarboxylic acids, such as hydroxybenzoic acid and hydroxynaphthoic acid, are supplementarily used according to circumstances.

Next, ingredient (B) for constructing the polyester copolymers according to the present invention are mainly aliphatic diols or ester-forming derivatives thereof. The typical substance of aliphatic diols or ester-forming derivatives thereof includes low molecular glycols or $C_2$ to $C_8$ such as ethylene glycol, 1,4-butylene glycol, 1,3-propane; diol, 1,4-butene diol, 1,6-hexane diol and 1,8-octane diol. In addition, high molecular glycol, such as polyalkylene oxide glycol, for example polyethylene oxide glycol, polybutylene oxide glycol and the like, can be used together with such low molecular glycol. Such a use of high molecular glycol together with low molecular glycol is remarkably effective for improving the elongation of aromatic polyesters, which are coating materials of an electric wire according to the present invention, and also providing bending-resistance to the polyester. Furthermore, aromatic alcohols of phosphinic acid having a bisphenol-A group, 4,4-dihydroxybiphenyl group and aromatic diol group and the like, polyhydroxylic compounds, such as alkylene oxide-added alcohol, glycerin and pentaerythritol, for example, two mols of ethylene oxide-added bisphenol A, two mols of propylene oxide-added bisphenol A and the like, or ester-forming derivatives thereof and the like can be supplementarily used as the ingredient (B).

Next, the ingredient (C) of the polyester copolymers as the composite of the present invention are the aromatic polyester copolymers with halogen atoms bonded in the molecule and obtained by using halogen-containing ester-forming compounds as monomers. The halogen-containing compounds used for this object include the following compounds. In addition, bromine is preferably used as the halogen.

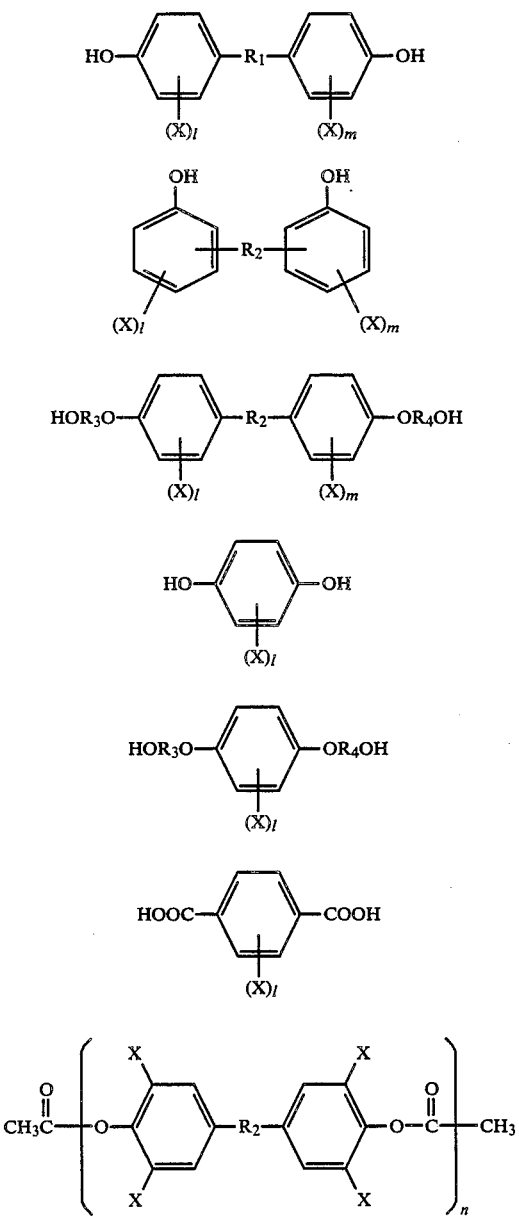

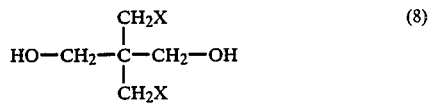

wherein

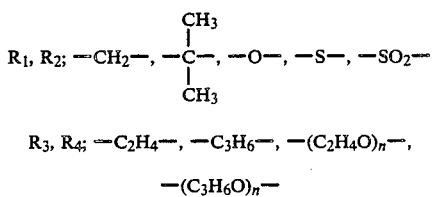

$R_3, R_4$; $-C_2H_4-$, $-C_3H_6-$, $-(C_2H_4O)_n-$, $-(C_3H_6O)_n-$

X: Halogen;

l, m: Integer of 1 to 4; and n: Integer of 1 or more

Halogen-containing compounds expressed by the general formulae (1) to (7) are preferably incorporated as the copolymer compounds. In the case where bromine is used as the halogen, tetrabromobisphenol A and tetrabromobisphenol sulfone are given as an example of the general formula (1), tetrabromobisphenol F as an example of the general formula (2), two moles of ethylene oxide-added tetrabromobisphenol A, two mols of propylene oxide-added tetrabromobisphenol A, two mols of ethylene oxide-added tetrabromobisphenol sulfone and two mols of propylene oxide-added tetrabromobisphenol sulfone as an example of the general formula (3), tetrabromohydroquinone as an example of the general formula (4), two mols of ethylene oxide-added tetrabromohydroquinone as an example of the general formula (5), tetrabromoterephthalic acid as an example of the general formula (6) and polycarbonate of tetrabromobisphenol A as an example of the general formula (7).

Halogen-contained compounds having a molecular weight of 390 or more are preferably used as monomers. A molecular weight which is too low does not contribute to the improvement of an oxygen index which is an index of flame-resistance. Halogen-containing compounds containing at least one aromatic ring in a molecule are preferably used.

These halogen-contained compounds are added so that the content of halogen in the formed copolyester may amount to 0.5 to 30% by weight, preferably 2 to 20% by weight. In the case where they are added at the ratio less than 0.5% by weight, a sufficient flame-resistance can not be attained while in the case where they are added at a ratio exceeding 30% by weight, mechanical properties become deteriorated, which is not preferable.

As to the rate of monomers for preparing the polyester copolymers used in the present invention, in the case where an ester-forming functional group of the ingredient (C), that is, halogen-contained compounds, is alcoholic, the ingredient (B) + the ingredient (C) are 90 to 200 mols, preferably 95 to 150 mols, based on 100 mols of the ingredient (A) while in the case where the ester-forming functional group of the ingredient (C), that is, halogen-contained compounds, is carboxylic, the ingredient (B) is 90 to 200 mols, preferably 95 to 150 mols, based on 100 mols of the ingredient (A) + the ingredient (C).

In the case where the coating material having a high oxygen index is required according to the conditions of use, a content of halogen in the copolymer is adjusted by suitably selecting the content of the ingredient (C) to meet the oxygen index aimed at.

The copolymers used in the present invention can be polymerized by known methods, such as melting polymerization, boundary polymerization and solid phase polymerization, and copolymers having an intrinsic viscosity of about 0.5 to 3.0 can be used.

The composite of the present invention is characterized by adding bisaziridine to said halogen-containing polyester copolymers at an appointed ratio.

The bisaziridine compounds are expressed by the following general formula (a):

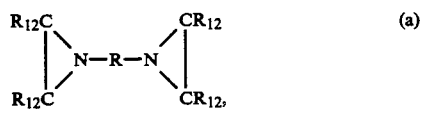

wherein R is a divalent organic group and $R_{12}$ is a hydrogen atom, an alkyl group or an aryl group.

In the general formula (a), R is preferably expressed by the following formula (b) or (c).

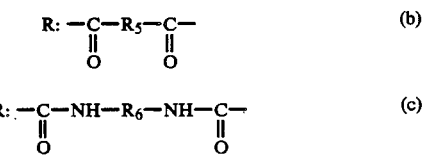

wherein $R_5$, $R_6$ is a divalent organic group.

It is preferable that $R_5$, $R_6$ is an organic group containing at least one aromatic ring.

The formula (b) expresses a dicarboxylic acid group. Usual dicarboxylic acids, such as terephthalic acid, isophthalic acid, naphthalene dicarboxylic acid, adipic acid, sebacic acid, trimeritic acid and succinic acid, can be used. Of them, terephthalic acid, isphthalic acid, naphthalene dicarboxylic acid and the like are preferably used.

These compounds can be produced by the conventional methods but a method of acting ethylene imine upon each chloride compound of the acids is easy.

The formula (c) expresses a nitrogen bond which can be introduced by various methods. A method of acting ethylene imine upon isocyanate is generally easy and usual diisocyanate can be used. This diisocyanate includes toluene-diisocyanate, methylene-diphenyl-diisocyanate, xylene-diisocyanate, naphthylene-diisocyanate, 3,3'-dimethyldiphenyl-4,4'-diisocyanate, hexamethylene-diisocyanate, isophoron-diisocyanate, hydrated methylene-biphenyl-diisocyanate, hydrated toluene-diisocyanate, resin-diiocyanate, bis(2-isocyanatethyl) fumarate and the like. Of them, ethylene-diphenyl-diisocyanate, xylilene-diisocyanate, isophoron-diisocyanate and the like are preferably used.

In addition, bisaziridine compounds expressed by the formula (a) include also addition compounds obtained by preliminarily acting them upon compounds having a reactive activated hydrogen, such as carboxylic acid, alcohol and thiol, before blending. High molecular compounds can be easily produced from low molecular compounds in the form of addition compounds having an end of the aziridine type by acting compounds having at least two activated hydrogen groups upon bisaziridine compounds.

Bisaziridine compounds are added at a ratio of 0.1 to 10% by weight, preferably 0.1 to 5% by weight, based on a total quantity of the composite. If this quantity is too little, the effects are not attained while if this quantity is too much, ill effects occur in that the viscosity is extremely increased and decomposed products are increased.

Although the coating material used in the present invention exhibits superior performances even without using additives, in order to further improve the performances of the coating material, stabilizers, such as antioxidants and ultraviolet ray absorbants, antistatic agents, flame-retardants, assistant flame-retardants, coloring agents such as dyestuffs and pigments, unguents for improving the fluidity and releasability, lubricants, crystallization promotors (nucleus agents), inorganic substances and the like can be used if necessary. Their addition together with aziridine compounds leads to a still more improved effect.

Hindered phenol series, amine series, phosphor series of compounds can be used as the stabilizers.

2,2'-methylene-bis (4-methyl-6-t-butylphenol), hexamethylene-glycol-bis (3,5-di-5-butyl-4-hydroxy hydrocinnamate), tetrakis [methylene(3,5-di-t-butyl-4-hydroxy-hydrocinnamate)]methane, triethylene-glycol-bis-3-(3-t-butyl-4-hydroxy-5-methylphenyl)propionate, 3,3,5-trimethyl-2,4,6-tris(3,5-t-butyl-4-hydroxybenzyl)-benzene, n-octadecyl-3-(4'-hydroxy-3',5'-di-t-butylphenol)propyonate, 4,4'-ethylene-bis(2,6-di-t-butylphenol), 4,4'-butylidene-bis(6-t-butyl-3-methylphenol), 2,2'-thiodientyl-bis[3-(3,5-di-t-butyl-4-hydroxyphenyl)-propionate, distearyl-3,5-di-t-butyl-4-hydroxybenzyl-phosphonate, and 2-5-butyl-6-(3-t-butyl-5-methyl-2-hydroxybenzyl)-4-methylphenyl acrylate can be used as the hindered phenol series of compounds singly or in combination. Of these compounds, hexamethylene-glycol-bis(3,5-di-t-butyl-4-hydroxyhydrocinnamate), tetrakis[methylene(3,5-di-t-butyl-4-hydroxyhydrocinnamate)] and triethylene-glycol-bis-3-(3-t-butyl-4-hydroxy-5-methylphenyl)propionate are preferably used.

The amine series of compounds include N-phenyl-N'-isopropyl-p-phenylene-diamine, N,N'-diphenyl-p-phenylene-diamine, 4,4'-bis(4-α,α-dimethylbenzyl)diphenylamine, condensation products of diphenylamine and acetone, N-phenylnaphthylamine, N,N'-di-β-naphthylphenylene-diamine and the like.

The phosphor series of compounds include phosphonite compounds expressed by the following general formula (9) and the like.

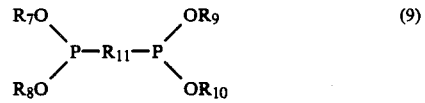

wherein $R_7$, $R_8$, $R_9$ and $R_{10}$ are same or different alkyl, substituted alkyl, aryl or substituted aryl group having 1 to 25 carbon atoms. These groups include a methyl group, ethyl group, butyl group, octyl group, decyl group, lauryl group, tridecyl group, stearyl group, phenyl group, alkyl and/or alkoxy-substituted phenyl group and the like. In addition, $R_{11}$ is an alkylene, substituted alkylene, arylene or substituted arylene group having 4 to 33 carbon atoms. These groups include a butylene group, octylene group, phenylene group, naphthylene group, diphenylene group, groups expressed by the following formula and the like.

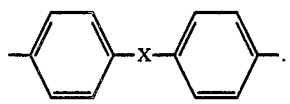

wherein X is an oxyl, sulfonyl, carbonyl, methylene, ethylidene, butylidene, isopropylene, diazonium group and the like. Tetrabikis, 2,4-di-5-butylphenyl-4,4'-diphenylene-phosphonite is preferably used as the phosphonite compounds.

The phosphonite compounds are added at a ratio of 0.01 to 5% by weight, preferably 0.1 to 3% by weight, based on a total quantity of the composite.

In addition, metallic compounds containing zinc and bismuth, clayey silicate, such as magnesium hydroxide and asbestos, and the like can be used as the assistant flame-retardants in addition to antimony compounds such as antimony trioxide and antimony halogenide.

In addition, the inorganic substances include general inorganic fibers, such as glass fiber, ceramic fiber, boron fiber, potassium titanate fiber and asbestos, powdery and granular substances, such as calcium carbonate, highly dispersive silicate, alumina, aluminium hydroxide, talc, clay, mica, glass flake, glass powder, glass bead, silica powder, quartz sand, wollastonite, carbon black, barium sulfate, plaster, silicon carbide, alumina, boron nitrite and silicon nitride plate-like inorganic compounds, whiskers and the like.

These inorganic fillers can be used singly or in combination.

In addition, in order to improve a melt extrusion coating property, lubricancy, flexibility and the like, organic high molecular substances can be supplementarily added singly or in combination. These organic high molecular substances include polyesters having other skeletons, polyamides, carboxylic acid-modified olefins and copolymers thereof, polyolefins, such as polyethylene, polypropylene and polybutene, modified polyolefins, such as polyacrylate and ABS, engineering plastics, such as polycarbonate, polyphenylene oxide, polyphenylene sulfide and fluorine resin, rubber-like elastic polymers, such as polyurethane, butyl rubber, ethylene propylene rubber and various kinds of elastomer, and the like.

The bisaziridine compounds can be added at any time during the polymerization process of polymers, pellet-forming process using an extruder and polymer-molding process using an extruder, injection molding machine, compression molding machine and the like.

The bisaziridine compounds are used by adding to the polymers when molten or previously mixing with powdery and pellet-like polymers prior to melting.

An electric wire according to the present invention is produced by the known methods. Usually, the coating material is coated on the travelling conductor by the melt extrusion. Both the case where the travelling direction of the conductor is identical with the extrusion direction of the coating material and the case where a cross head having an appointed angle is used can manufacture an electric wire according to the present invention.

A screw type extruder, which is easy in controlling the flow rate of the coating material, is preferably used.

Methods of detecting an uneven thickness of the coating material using X-ray, ultrasonic wave and the like are used.

An eccentricity due to the uneven thickness of the coating material is expressed by a concentric coefficient $e_c$. The larger $e_c$ is desired and selected at 65% or more, preferably 70% or more.

$$e_c = \frac{e_{min}}{e_{max}} \times 100$$

$e_{min}$: minimum thickness of a section of the coating material $e_{max}$: maximum thickness of a section of the coating material.

In order to control the uneven thickness, a method of detecting it by the uneven thickness detector and automatically or manually adjusting a clearance between a die and a conductor at a die center portion of the screw type extruder, a method of adjusting said clearance by controlling the flow rate of the coating material together with the pressure and temperature of the coating material and the like are used.

Also, the use of a non-eccentric head on the die is effective for reducing uneven thickness.

In manufacture, in order to further increase the mechanical strength of the coating material at request, the coating material may be coated and formed and then passed through the heating zone. The temperature of the heating zone is selected at a melting point of the coating material or less but a glass-transition point of the coating material or more.

EFFECTS OF THE INVENTION

Since a halogen-contained resin composite according to the present invention is remarkably improved in deterioration of properties caused by thermal hysteresis, in comparison with the conventional polyester series of coating material, the following superior effects can be attained.

(1) Since the coating material is superior in flame-resistance and the deterioration of properties due to a reduction in thermal hysteresis, it is effectively positioned for an electric wire used in the vicinity of a heat source, an engine of a transport apparatus and a heat-generating part of an electric product.

(2) Since it is possible to reduce the thickness of the coating material without spoiling the mechanical characteristics and electrical characteristics and the coating material is rich in inflectional property, an effective utilization of a limited space can be remarkably increased. In particular, it can be effectively used for an electric wire used in transport apparatus, such as a space rocket, an aircraft or a motorcar, having a high accumulation degree of information and restricted in spatial capacity, electric products, computers, information-connected apparatus and the like.

(3) Since halogen-contained compounds are incorporated in the copolymers, the coating material according to the present invention does not exhibit the oozing as found when a flame-retardant was added at high temperatures, so that it is superior in external appearance and shape, and since the blocking of electric wires among themselves in the manufacturing process can be prevented, the coating cost can be reduced.

On account of the above described special features, the coating material obtained according to the present invention can be used for not only an electric wire in the field, such as transport apparatus, electric apparatus, electronic apparatus, information apparatus and miscellaneous machinery, but also various kinds of apparatus material, parts and the like, preferably that requiring properties in addition to the above described examples.

PREFERRED EMBODIMENTS

The present invention is described below with reference to the preferred embodiments. The copolymers P, Q and R were produced in the following manner.

MANUFACTURING EXAMPLE 1

(Preparation of the copolymer P)

Dimethyl terephthalate of 970 parts by weight, 1,4-butane diol of 513 parts by weight, ethylene oxide of two mols-added tetrabromo-bisphenol A of 158 parts by weight and tetrabutoxytitanium of 0.7 parts by weight were put in a reaction vessel provided with a stirrer, nitrogen-introducing pipe and efflux pipe and stirred for 30 minutes at 160° C. in a flow of nitrogen gas. The resulting mixture was gradually heated from 200° C. to 270° C. for 2 hours with stirring. Subsequently, the introduction of nitrogen into the reaction vessel was stopped and then, the inside of the reaction vessel was gradually depressed to a pressure of 0.3 mmHg within 30 minutes and the reaction mixture was stirred at this pressure for 3 hours. The resulting polymer exhibited an intrinsic viscosity of 1.0 and a bromine-content of 6.5% by weight.

MANUFACTURING EXAMPLE 2

(Preparation of the copolymer Q)

Dimethyl terephthalate of 970 parts by weight, 1,4-butane diol of 513 parts by weight, propylene oxide of two mols-added tetrabromo-bisphenol sulfone of 171 parts by weight and tetrabutoxy-titanium of 0.7 parts by weight were put in a reaction vessel provided with a stirrer, nitrogen-introducing pipe and efflux pipe and stirred for 30 minutes at 160° C. in a flow of nitrogen gas. The resulting mixture was gradually heated from 200° C. to 270° C. for 2 hours with stirring. Subsequently, the introduction of nitrogen into the reaction vessel was stopped and then, the inside of the reaction vessel was gradually depressed until a pressure of 0.3 mmHg was reached after 30 minutes and the reaction mixture was stirred for 3 hours at this pressure and 270° C. The resulting polymer showed an intrinsic viscosity of 1.1 and a bromine-content of 6.3% by weight.

MANUFACTURING EXAMPLE 3

(Preparation of the copolymer R)

Dimethyl terephthalate of 900 parts by weight, 1,4-butane diol of 450 parts by weight, polybutylene oxide glycol having a mean molecular weight of 400 of 50 parts by weight, ethylene, oxide of two mols-added tetrabromo-bisphenol A of 158 parts by weight and tetrabutoxytitanium of 0.7 parts by weight were put in a reaction vessel provided with a stirrer, nitrogen-introducing pipe and efflux pipe and stirred for 30 minutes at 180° C. in a flow of nitrogen gas. The resulting mixture was gradually heated from 200° C. to 270° C. for 3 hours with stirring. Subsequently, the introduction of nitrogen into the reaction vessel was stopped and then, an inside of the reaction vessel was gradually depressed until a pressure of 0.5 mmHg was reached after 15 minutes and the reaction mixture was stirred for 6 hours at this pressure. The resulting polymer showed an intrinsic viscosity of 1.0 and a bromine-content of 6.5% by weight.

EXAMPLE 1

Powdery isophthaloyl-bisazilidine (hereinafter called IPBA for short) of 1.5 parts by weight was blended with the copolymer P of 98.5 parts by weight and the resulting mixture was extruded by means of the conventional extruder to obtain uniformly molten and mixed pellets. The resulting pellets were injected by means of an injection molding machine in the conventional manner to prepare test pieces and their physical properties were evaluated.

The physical properties were measured by the following methods:

The tensile strength and elongation (%) were measured in accordance with ASTM D 638. The dielectric breakdown and the dielectric constant was measured in accordance with ASTM D 149 short time method and DISO a kHz, respectively. In addition, the flame resistance was measured by a test method conforming to UL-94V and the case where the flame was extinguished within 30 seconds was evaluated as o while the case where the flame was not extinguished within 30 seconds was evaluated as x. The oxygen index was measured in accordance with JIS K 7201. As to the surface shape, the surface state was observed after 72 hours at 120° C. and the case where something wrong, such as bleed and swelling, exist was evaluated as x while the case where something wrong, such as bleed and swelling, do not exist was evaluated o.

In addition, the tensile test piece was held in a thermostatic oven of 120° C. and the elongation and elongation-holding coefficient after 500 hours were measured in the same manner.

Furthermore, the resin composite was coated on circular compression stranded wires made of copper having an outside diameter of about 1.9 mm so that the film-thickness may amount to 0.3 mm to produce an electric wire. The resulting wires were held in a thermostatic oven of 120° C. After a lapse of 500 hours, the wire was bent 10 times at an angle of 90° and its surface state was investigated to evaluate the inflection property. The case where cracks or fine cracks were generated was evaluated x while the case where cracks or fine cracks were not generated was evaluated o.

The results of measurement are shown in Table 1.

EXAMPLE 2

Powdery diphenyl-methane-bis-4,4'-N,N'-diethylene urea (hereinafter called DMIA for short) of 1.5 parts by weight was blended with the copolymer P of 98.5 parts by weight. The resulting mixture was extruded by means of the conventional extruder to obtain uniformly molten and mixed pellets. The obtained resin composite was evaluated in the same manner as in Example 1. The results are shown in Table 1.

EXAMPLES 3, 4

The evaluation was carried out in the same manner as in Example 1 except that the copolymer Q was used. The results are shown in Table 1.

EXAMPLES 5, 6

The evaluation was carried out in the same manner as in Example 1 except that the copolymer R was used. The results are shown in Table 1.

EXAMPLES 7 TO 9

Triethylene glycol bis[3-(3-t-butyl-5-methyl-4-hydroxyphenyl)propionate] (Irganox ® 245) was added to each of Examples 1, 3, 5 as an antioxidant at a ratio of 1.0 parts by weight based on 100 parts by weight of the resin and the resulting resin composite each was evaluated in the same manner as in Example 1. The results are shown in Table 1.

EXAMPLES 10 TO 12

The evaluation was carried out in the same manner as in Example 1 excepting that the resin composition was changed as shown in Table 1. The results are shown in Table 1.

COMPARATIVE EXAMPLES 1 TO 6

The evaluation was carried out in the same manner as in Example 1 except that the copolymer used and the resin composition were changed as shown in Table 1. The results are shown in Table 1.

COMPARATIVE EXAMPLE 7

IPBA of 1.5 parts by weight was added to polybutylene terephthalate of 98.5 parts by weight and the test pieces were prepared by mixing and evaluated in the same manner as in Example 1. The results are shown in Table 1.

COMPARATIVE EXAMPLE 8

IPBA of 1.5 parts by weight and decabromodiphenylether of 12.5 parts by weight were added to polybutylene terephthalate of 86 parts by weight and the test pieces were prepared by mixing and evaluated in the same manner as in Example 1. The results are shown in Table 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | Example |  |  |  |  |  |  |  |  |  |  |  |
|---|---|---|---|---|---|---|---|---|---|---|---|---|
|  | 1 | 2 | 3 | 4 | 5 | 6 | 7 | 8 | 9 | 10 | 11 | 12 |
| Resin composition | | | | | | | | | | | | |
| Resin used (parts by weight) | P 98.5 | P 98.5 | Q 98.5 | Q 98.5 | R 98.5 | R 98.5 | P 98.5 | Q 98.5 | R 98.5 | P 99.7 | P 96 | P 90 |
| Aziridine IPBA (parts by weight) | 1.5 | — | 1.5 | — | 1.5 | — | 1.5 | 1.5 | 1.5 | 0.3 | 4 | 10 |
| MDIA (parts by weight) | — | 1.5 | — | 1.5 | — | 1.5 | — | — | — | — | — | — |
| Flame-retardant (parts by weight) | — | — | — | — | — | — | — | — | — | — | — | — |
| Stabilizer (parts by weight) | — | — | — | — | — | — | 1.0 | 1.0 | 1.0 | — | — | — |
| Dielectric breakout (kV/mm) | 16 | 16 | 16 | 16 | 16 | 16 | 16 | 16 | 16 | 17 | 17 | 16 |
| Dielectric constant | 3.2 | 3.2 | 3.1 | 3.1 | 3.2 | 3.2 | 3.2 | 3.1 | 3.2 | 3.2 | 3.2 | 3.2 |
| Flame-resistance | o | o | o | o | o | o | o | o | o | o | o | o |
| Oxygen index | 27 | 27 | 27 | 27 | 27 | 27 | 27 | 27 | 27 | 27 | 27 | 27 |
| Surface shape | o | o | o | o | o | o | o | o | o | o | o | o |
| Tensile strength (kg/cm$^2$) | 577 | 611 | 565 | 624 | 465 | 510 | 577 | 564 | 465 | 549 | 580 | 520 |
| Elongation (%) | 330 | 295 | 325 | 290 | 510 | 315 | 330 | 325 | 500 | 345 | 305 | 172 |
| After 500 hours at 120° C. | | | | | | | | | | | | |
| Elongation (%) | 280 | 254 | 273 | 247 | 413 | 252 | 290 | 293 | 425 | 141 | 268 | 126 |
| Elongation holding coefficient (%) | 85 | 86 | 84 | 85 | 81 | 80 | 88 | 90 | 85 | 41 | 88 | 73 |
| Inflection property | o | o | o | o | o | o | o | o | o | o | o | o |

|  | Comparative Example |  |  |  |  |  |  |  |
|---|---|---|---|---|---|---|---|---|
|  | 1 | 2 | 3 | 4 | 5 | 6 | 7 | 8 |
| Resin composition | | | | | | | | |
| Resin used (parts by weight) | P 100 | Q 100 | R 100 | P 99 | Q 99 | R 99 | PBT 98.5 | PBT 86 |
| Aziridine IPBA (parts by weight) | — | — | — | — | — | — | 1.5 | 1.5 |
| MDIA (parts by weight) | — | — | — | — | — | — | — | — |
| Flame-retardant (parts by weight) | — | — | — | — | — | — | — | 12.5 |
| Stabilizer (parts by weight) | — | — | — | 1.0 | 1.0 | 1.0 | — | — |
| Dielectric breakout (kV/mm) | 17 | 17 | 17 | 18 | 17 | 17 | 14 | 14 |
| Dielectric constant | 3.2 | 3.2 | 3.3 | 3.2 | 3.2 | 3.3 | 3.3 | 3.1 |
| Flame-resistance | o | o | o | o | o | o | x | o |
| Oxygen index | 27 | 27 | 27 | 27 | 27 | 27 | 22 | 27 |
| Surface shape | o | o | o | o | o | o | o | x |
| Tensile strength (kg/cm$^2$) | 543 | 550 | 450 | 543 | 550 | 451 | 530 | 540 |
| Elongation (%) | 350 | 345 | 550 | 350 | 345 | 548 | 300 | 72 |
| After 500 hours at 120° C. | | | | | | | | |
| Elongation (%) | 77 | 79 | 110 | 102 | 114 | 148 | 246 | 50 |
| Elongation holding coefficient (%) | 22 | 23 | 20 | 29 | 33 | 27 | 82 | 69 |
| Inflection property | x | x | x | x | x | x | o | x |

What is claimed is:

1. A halogen-containing polyester resin composition comprising bisaziridine compounds and a flame-resisting aromatic polyester copolymer containing a halogen in an amount of 0.5 to 30% by weight, said polyester copolymer obtained by poly-condensating
   (A) mainly aromatic dicarboxylic acids or ester-forming derivatives thereof;
   (B) mainly aliphatic glycols or ester-forming derivatives thereof; and
   (C) halogen-containing ester-forming compounds, said bisaziridine compounds being present in an amount of 0.1 to 10% by weight based on the total quantity of the composite.

2. The resin composition as set forth in claim 1, in which the halogen is bromine.

3. The resin composition as set forth in claim 1 or 2, in which the aliphatic glycols (B) are low molecular weight glycols of $C_2$ to $C_8$.

4. The resin composition as set forth in claim 1 or 2, in which the aliphatic glycols (B) are low molecular weight glycols of $C_2$ to $C_8$ and polyalkyleneoxide glycols having a molecular weight of 200 to 4,000.

5. The resin composition as set forth in claim 3 in which said low molecular weight glycols or $C_2$ to $C_8$ are at least one member selected from the group consisting of ethylene glycol, 1,4-butylene glycol and 1, 4-butene glycol.

6. The resin composition as set forth in claim 1 or 2, in which said bisaziridine compounds are compounds expressed by the following general formula (a):

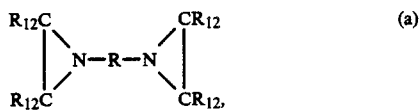

wherein R is a divalent organic group and $R_{12}$ is a hydrogen atom, an alkyl group or an aryl group.

7. The resin composition as set forth in any one of claims 1, 2 or 5, in which stabilizers are added at a ratio of 0.1 to 3% by weight based on a total quantity of the composition.

8. An electric wire, containing a coating material comprising a halogen-containing polyester resin composite obtained by adding bisaziridine compounds to flame-resisting aromatic polyester compolymers containing halogen in an amount of 0.5 to 30% by weight and obtained by polycondensating (A) mainly aromatic dicarboxylic acids or ester-forming derivatives thereof;

(B) mainly aliphatic glycols or ester-forming derivatives t hereof; and (C) halogen-containing ester-forming compounds, said bisaziridine compounds being present in an amount of 0.1 to 10% by weight based on the total quantity of the composition disposed on the surface of the wire.

9. The electric wire as set forth in claim 8, in which said halogen is bromine.

10. The electric wire as set forth in claim 8 or 9, in which said electric wire is a low-voltage electric wire.

11. The electric wire as set forth in claim 10, in which said electric wire is a low-voltage electric wire for use in a car.

12. The resin composition as set forth in claim 4, in which said low molecular weight glycols or $C_2$ to $C_8$ are at least one member selected from the group consisting of ethylene glycol, 1,4-butylene glycol and 1,4-butene glycol.

13. The resin composition as set fort in claim 3, in which stabilizers are added at a ratio of 0.1 to 3.0% by weight based on a total quantity of the composition.

14. The resin composition as set forth in claim 4, in which stabilizers are added at a ratio of 0.1 to 3% by weight based on a total quantity of the composition.

15. The resin composition as set forth in claim 6, in which stabilizers are added at a ratio of 0.1 to 3% by weight based on a total quantity of the composition.

* * * * *